United States Patent
Shinohara et al.

(10) Patent No.: US 8,811,264 B2
(45) Date of Patent: Aug. 19, 2014

(54) RELAY STATION, COMMUNICATION SYSTEM, AND COMMUNICATION METHOD

(75) Inventors: Chiaki Shinohara, Fukuoka (JP);
Kazuhisa Obuchi, Kawasaki (JP);
Yoshiharu Tajima, Kawasaki (JP);
Yoshinori Soejima, Fukuoka (JP);
Manabu Kubota, Fukuoka (JP); Miki Yamasaki, Fukuoka (JP); Shinya Okamoto, Fukuoka (JP); Akihide Otonari, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 124 days.

(21) Appl. No.: 13/416,105

(22) Filed: Mar. 9, 2012

(65) Prior Publication Data
US 2012/0224500 A1    Sep. 6, 2012

Related U.S. Application Data

(63) Continuation of application No. PCT/JP2009/066187, filed on Sep. 16, 2009.

(51) Int. Cl.
| | | |
|---|---|---|
| *H04L 12/28* | (2006.01) | |
| *H04W 84/04* | (2009.01) | |
| *H04J 1/16* | (2006.01) | |
| *H04B 7/155* | (2006.01) | |
| *H04W 24/10* | (2009.01) | |
| *H04W 28/06* | (2009.01) | |
| *H04W 88/08* | (2009.01) | |

(52) U.S. Cl.
CPC ......... *H04W 84/047* (2013.01); *H04B 7/15507* (2013.01); *H04W 24/10* (2013.01); *H04W 28/06* (2013.01); *H04W 88/08* (2013.01)
USPC ............................ 370/315; 370/252; 370/328

(58) Field of Classification Search
CPC .................................................... H04B 7/15507
USPC ......................................... 370/252, 315, 328
See application file for complete search history.

(56) References Cited

U.S. PATENT DOCUMENTS

| | | | |
|---|---|---|---|
| 2007/0197161 A1* | 8/2007 | Walke et al. ...................... 455/7 |
| 2009/0092072 A1 | 4/2009 | Imamura et al. |

(Continued)

FOREIGN PATENT DOCUMENTS

| | | |
|---|---|---|
| JP | 2009-524981 | 7/2009 |
| JP | 2011-509052 | 3/2011 |

(Continued)

OTHER PUBLICATIONS

Notice of Rejection issued for corresponding Japanese Patent Application No. 2011-531705, mailed Mar. 12, 2013 with English translation.

(Continued)

*Primary Examiner* — John Pezzlo
(74) *Attorney, Agent, or Firm* — Myers Wolin, LLC

(57) ABSTRACT

A measuring unit measures the line quality with an eNB. A receiving unit receives line quality information transmitted from an UE. When the line quality measured by the measuring unit is different from line quality contained in the line quality information received by the receiving unit, a transmitting unit changes, the received target data to data for a layer that is different from the physical layer, and transmits the changed data to the UE.

6 Claims, 11 Drawing Sheets

(56) References Cited

U.S. PATENT DOCUMENTS

| | | |
|---|---|---|
| 2009/0227201 A1 | 9/2009 | Imai et al. |
| 2010/0118989 A1* | 5/2010 | Sayana et al. ............... 375/260 |
| 2012/0063417 A1* | 3/2012 | Redana et al. ............... 370/331 |

FOREIGN PATENT DOCUMENTS

| | | |
|---|---|---|
| WO | 2006/098273 | 9/2006 |
| WO | 2006/118125 | 11/2006 |
| WO | 2007/086842 | 8/2007 |
| WO | 2009/088937 | 7/2009 |

OTHER PUBLICATIONS

International Search Report issued for corresponding International Patent Application No. PCT/JP2009/066187, mailed Dec. 8, 2009.

3GPP TR 36.913 V8.0.1; 3rd Generation Partnership Project; Technical Specification Group Radio Access Network; Requirements for further advancements for Evolved Universal Terrestrial Radio Access (E-UTRA) (LTE-Advanced) (Release 8) Mar. 2009.

Japanese Office Action issued for corresponding Japanese Patent Application No. 2011-531705, mailed on Jun. 11, 2013, with full English translation.

Zte, "Approach for Selecting Relay Operation Mode Based on User Traffic Types", Agenda Item: 15.3, 3GPP TSG-RAN WG1 #56-bis, R1-091439, Mar. 23-27, 2009, URL: <http://www.3gpp.org/ftp/tsg_ran/wg1_rl1/TSGR1_56b/Docs/R1-091439.zip>, Seoul, Korea.

* cited by examiner

FIG.6

| TERMI-NATION SUBLAYER | VARIA-BLE TrBLK | TERMI-NATION DATA | RETRANS-MISSION CONTROL | ORDER CONT-ROL | REMARKS |
|---|---|---|---|---|---|
| L1 (PHY) | FIXED | TrBLK | N/A | N/A | NOT PERFORM RETRANSMISSION CONTROL, LESS DELAY ADVANTAGES: LESS DELAY DISADVANTAGES: RS DOES NOT PERFORM RETRANSMISSION EVEN IF ERROR OCCURS AT RS TrBLK MAY SOMETIMES NOT BE CHANGED DEPENDING ON RADIO ENVIRONMENT * SUITABLE FOR REAL-TIME DATA, SUCH AS VOICE |
| MAC | VARIA-BLE | MAC-SDU | A | N/A | DELAY OCCURS DUE TO RETRANSMISSION OF HARQ ADVANTAGES: RS CAN PERFORM RETRANSMISSION USING RETRANSMISSION CONTROL DISADVANTAGES: ORDER CONTROL IS NOT AVAILABLE |
| RLC | VARIA-BLE | RLC-SDU | A | A | DELAY OCCUR DUE TO RETRANSMISSION AND ORDER CONTROL PERFORMED BY HARQ AND ARQ ADVANTAGES: RETRANSMISSION CONTROL AND ORDER CONTROL ARE AVAILABLE DISADVANTAGES: DELAY BECOME LARGE * SUITABLE FOR PACKET TRANSMISSION |
| PDCP | VARIA-BLE | IP | A | A | DELAY OCCUR DUE TO RETRANSMISSION AND ORDER CONTROL (RLC AND PDCP) PERFORMED BY HARQ AND ARQ ADVANTAGES: RETRANSMISSION CONTROL AND ORDER CONTROL ARE AVAILABLE TRANSMISSION CAN BE MADE USING ANOTHER RADIO SYSTEM BECAUSE IP CAN BE USED DISADVANTAGES: IF UE MOVE TO ANOTHER RS, RETRANSMISSION IS PERFORMED FROM eNB. DELAY BECOME LARGE. |

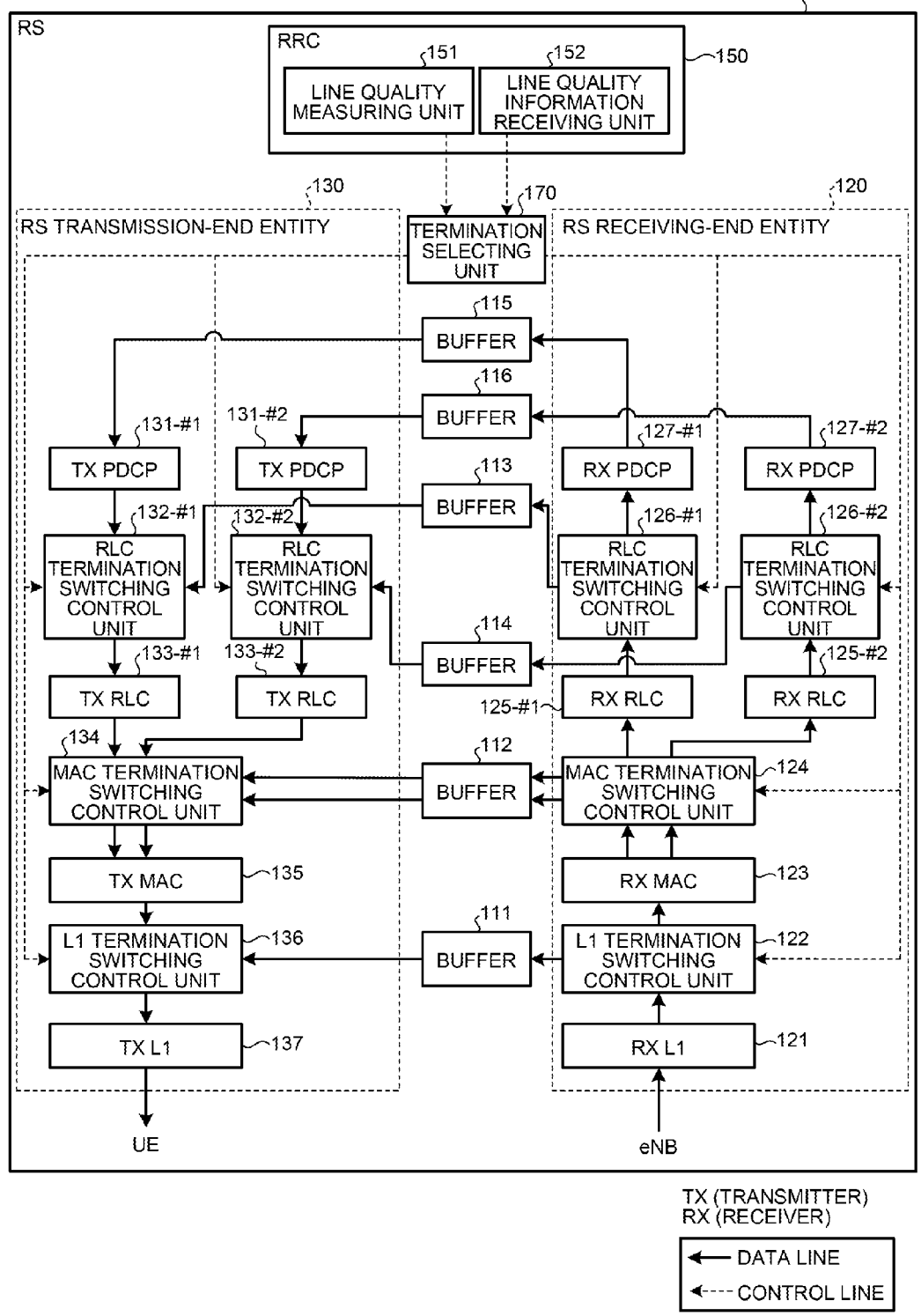

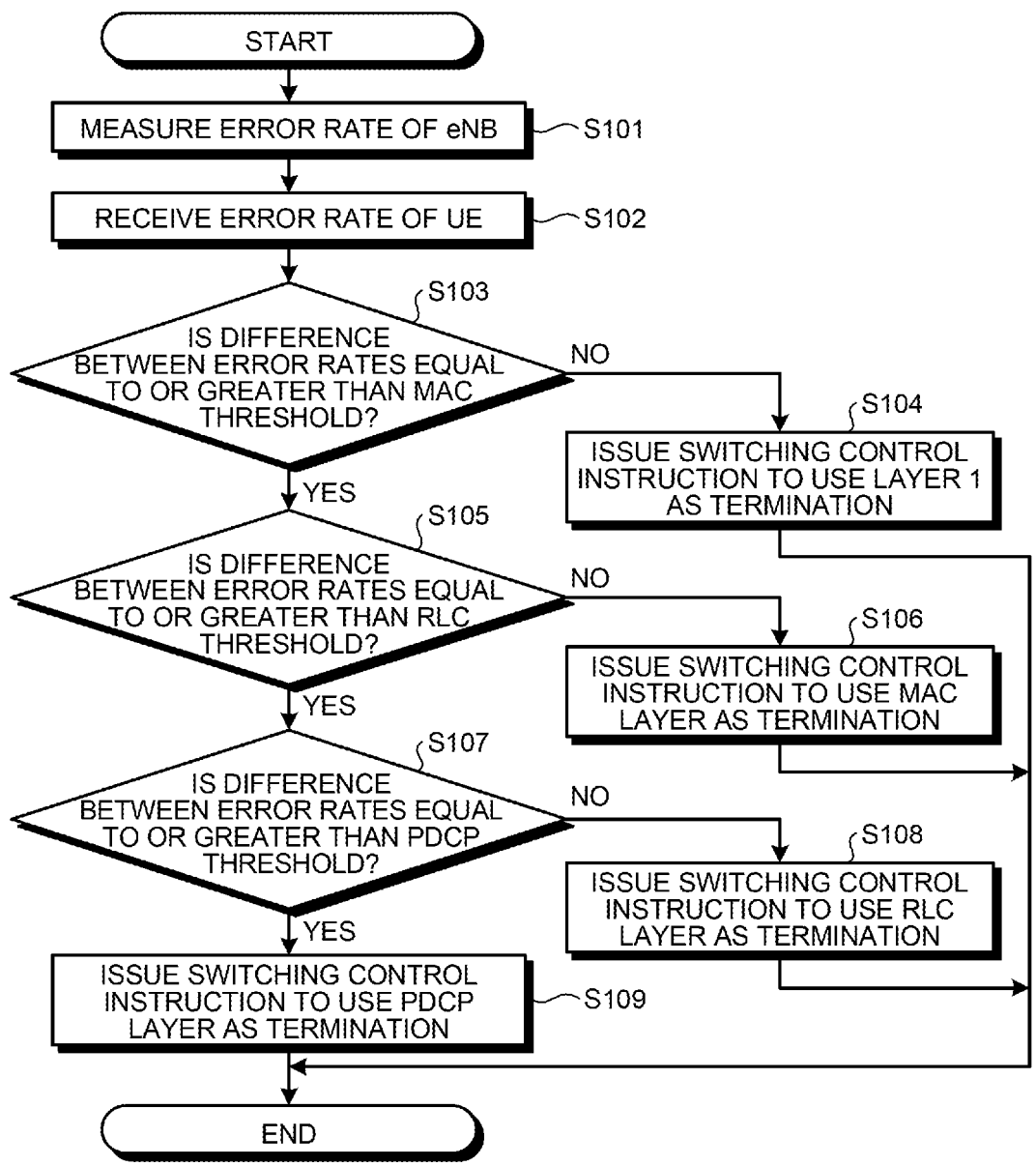

RELAY STATION, COMMUNICATION SYSTEM, AND COMMUNICATION METHOD

CROSS-REFERENCE TO RELATED APPLICATION

This application is a continuation of International Application No. PCT/JP2009/066187, filed on Sep. 16, 2009, the entire contents of which are incorporated herein by reference.

FIELD

The embodiments discussed herein are directed to a relay station, a communication system, and a communication method that relays data between a radio base station and mobile terminal.

BACKGROUND

A wireless communication system uses a layer configuration in which a protocol layer is divided into multiple layers and the divided layer is further divided into multiple sublayers. For example, in the 3rd Generation Partnership Project (3GPP), layer-2, which corresponds to a data link layer, includes three sublayers: a medium access control (MAC), a radio link control (RLC), and a packet data convergence protocol (PDCP).

FIG. 10 illustrates a protocol configuration of layer-2. As illustrated in FIG. 10, layer-2 has a MAC entity that belongs to a MAC sublayer, an RLC entity that belongs to an RLC sublayer, and a PDCP entity that belongs to a PDCP sublayer. Here, a transport channel is a service access point (SAP) that is defined between layer-1 (physical layer) and the MAC sublayer. A logical channel is a SAP that is defined between the MAC sublayer and the RLC sublayer. Furthermore, a radio bearer is a SAP that is defined by the PDCP layer that can multiplex multiple logical channels to the transport channel. Although not illustrated in FIG. 10, layer-1 is located at a lower layer in the MAC sublayer.

Communication devices arranged on the receiving end and the transmission end of a wireless communication system have a layer configuration as illustrated in FIG. 10. In the following, processes performed by a transmission-end entity and a receiving-end entity will be described.

From among sublayer entities in layer-2, a PDCP entity and an RLC entity are present in accordance with the number of logical channels (LCH) (n in FIG. 10) that are used for communication. The PDCP entity and the RLC entity performs packet data unit (PDU) transmission by associating with each other.

By using a bandwidth that can be used for data transmission or a radio resource, such as electrical power, a MAC entity on the transmission end determines free space for the MAC-PDU, appropriately allocates the RLC-PDU that is output from each of the n RLC entities to free space for the MAC-PDU, and performs multiplexing. Then, the MAC entity adds a MAC header to the multiplexed RLC-PDU (packet data unit) and transfers the obtained MAC-PDU to a hybrid automatic repeat request (HARQ).

In contrast, a MAC entity on the receiving end analyzes the PDU transferred from the HARQ, divides the PDU into two or multiple RLC-PDUs, and transfers them to each RLC entity. Then, the RLC entity on the receiving end analyzes the RLC-PDU, constructs an RLC-SDU, and transfers it to the PDCP entity.

Furthermore, in a transmission process, by holding the MAC-PDU at the time of transmission, the HARQ on the transmission end performs an error correction process and a cyclic redundancy check (CRC) encoding on the MAC-PDU.

In contrast, when received information indicates a reception error, i.e., when an error detection result of the CRC coding indicates a negative, an HARQ on the receiving end replies to the other end (transmission end) with a negative acknowledgment (NACK). When received information is acceptable, i.e., when an error detection result of the CRC code indicates a positive, the receiving end replies to the other end (transmission end) with an acknowledgement (ACK). Furthermore, when the MAC entity on the transmission end receives a NACK, the MAC entity re-transmits the subject MAC-PDU. When the MAC entity receives an ACK, the MAC entity cancels the MAC-PDU that is held at the time of initial transmission and transmits a new MAC-PDU.

Furthermore, when the MAC entity does not receive an ACK even when the MAC entity repeatedly re-transmits a single MAC-PDU by the number of times corresponding to the maximum number of re-transmissions, the MAC entity cancels the subject MAC-PDU. In such a case, the RLC entity performs retransmission control using an automatic repeat request (ARQ) that uses poll/status information.

In recent years, the LTE-advanced edition, which is a function-extended edition of Long Term Evolution (LTE), is being studied as part of the 3GPP and therefore there are plans to introduce relay stations (RS). FIG. 11 illustrates a system configuration when an RS is used. In (1) of FIG. 11, a system configuration when an RS is not used is illustrated. In (2) of FIG. 11, a system configuration when an RS is used is illustrated. In FIG. 11, an evolved Node B (eNB) indicates a base station and the symbol UE indicates user equipment.

As illustrated in FIG. 11, when an RS is not used, downlink or uplink communication is performed between the eNB and the UE. Then, when an RS is used in the future, the downlink or the uplink communication is performed among the eNB, the RS, and the UE.

When an RS is used, the eNB and the UE usually have three sublayers in layer-2 as the protocol stack; however, the number of sublayers included in layer-1 or layer-2 in an RS has not been determined.

Non-Patent Document 1: "Evolved Universal Terrestrial Radio Access (E-UTRA); LTE-Advanced (Release 8)" 3GPP TR 36.913 V8.0.1 (2009-03)

However, the features of sublayers included in layer-1 and layer-2 in an RS have advantages and disadvantages; therefore, an optimum protocol is not configured even when an RS includes a sublayer of layer-1 or layer-2 functioning as a termination. Specifically, when a termination of a layer included in the RS is fixed, there may be a case in which the feature of the layer is not suitable for a radio environment, thereby an unsuitable protocol is configured.

In the following, for example, it will be assumed that the description is of a downlink of eNB-RS-UE when the RS has layer-1. In such a case, because a transport block (TrBLK) passes the RS without the size of the TrBLK being adjusted in the RS, only the data having the same size is transmitted between the eNB-RS and between the RS-UE. Accordingly, the data size of the TrBLK between one section (between RS-UE) is determined on the basis of the radio environment of the other section (between eNB-RS). In other words, the data size of the TrBLK is not changed between the RS-UE.

Accordingly, when a radio environment of the eNB-RS is different from that of the RS-UE, it is not possible to configure an optimum protocol in an RS. For example, when a radio environment of the RS-UE is worse than that of the eNB-RS, the error rate of the data becomes high, thus the data is less likely to be delivered. In contrast, when a radio environment of RS-UE is better than that of the eNB-RS, a TrBLK having data size larger than that of the eNB-RS can be transmitted. However, it is only possible to transmit the TrBLK having the same data size as that of RS-UE.

SUMMARY

According to an aspect of an embodiment of the invention, a relay station includes: a measuring unit that measures line quality between the radio base station and the relay station; a receiving unit that receives line quality information from the user equipment; and a transmitting unit that changes, when the line quality measured by the measuring unit is different from line quality contained in the line quality information received by the receiving unit, the received target data to data for a layer that is different from the physical layer, and transmits the changed data to the mobile terminal.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 6 is a list of advantages and disadvantages of each layer included in the RS;

FIG. 7 is a block diagram illustrating the configuration of a relay station (RS) according to a second embodiment;

FIG. 8 is a flowchart illustrating the flow of a termination switching control process according to the second embodiment;

DESCRIPTION OF EMBODIMENT(S)

Preferred embodiments of the present invention will be explained with reference to accompanying drawings. The present invention is not limited to the embodiments.

[a] First Embodiment

Figure 1:
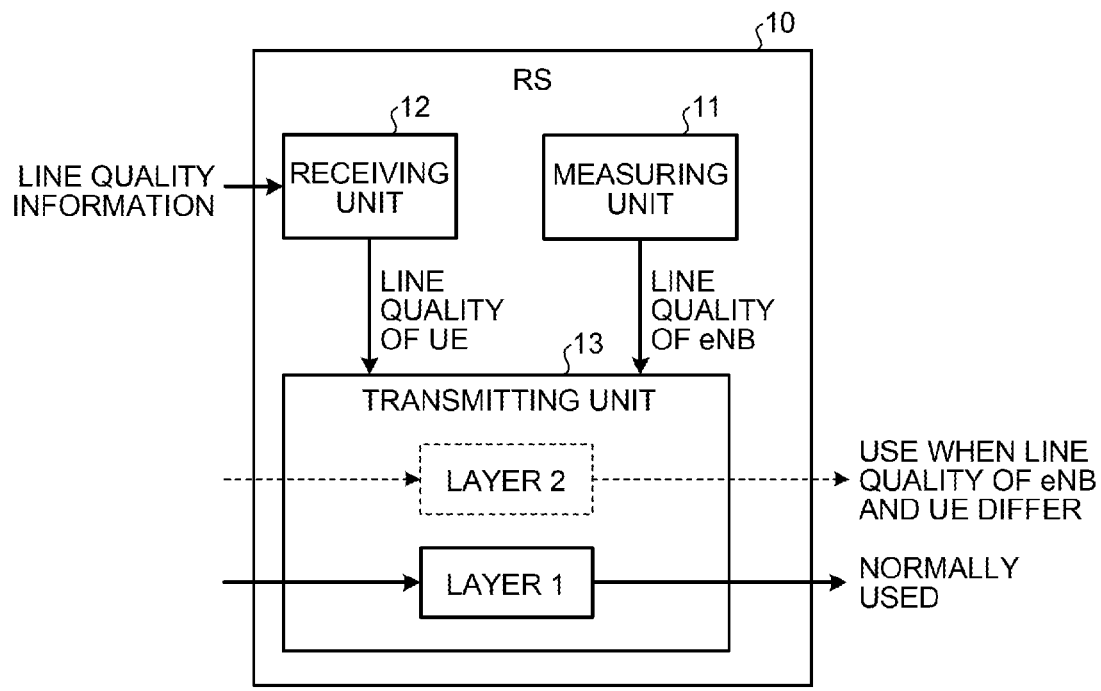
FIG. 1 is a block diagram illustrating the configuration of a relay station (RS) according to a first embodiment.

FIG. 1 is a block diagram illustrating the configuration of a relay station (RS) according to a first embodiment. An RS 10 illustrated in FIG. 1 includes a measuring unit 11, a receiving unit 12, and a transmitting unit 13.

The measuring unit 11 measures the line quality between the RS 10 and a radio base station (eNB: evolved Node B) 20. The receiving unit 12 receives line quality information sent from mobile terminal (UE: user equipment) 30. When the line quality measured by the measuring unit 11 is different from that contained in the line quality information received by the receiving unit 12, the transmitting unit 13 changes target data to target data of a layer other than the physical layer and transmits the changed data to the UE 30.

Specifically, when the line quality between the eNB-RS is different from that between the RS-UE, the RS 10 performs downlink communication by using layer-2 as a termination. Accordingly, when the line quality between the RS-UE is worse than that between the eNB-RS, the RS 10 can reduce the size of the transport block (TrBLK) between the RS-UE in layer-2 than the size of that between the RS-UE, thus preventing the error rate between the RS-UE to be increased. In contrast, when the line quality between the RS-UE is better than that between the eNB-RS, the RS 10 can make the size of the TrBLK between the RS-UE in layer-2 greater than that between the RS-UE, thus effectively using the radio resource.

Furthermore, when the line quality between the eNB-RS is the same as that between the RS-UE, the RS 10 performs the downlink communication, by using layer-1 as a termination, without performing a transmitting/receiving process in layer-2. Accordingly, when the size of the TrBLK does not need to be changed between the RS-UE, data can be passed through the RS 10 while the size of the TrBLK between the eNB-RS is fixed. Accordingly, there is no need to change the size of the TrBLK in layer-2 and a delay due to retransmission control can be prevented.

As described above, with the RS 10 according to the first embodiment, an optimum protocol can be configured regardless of the line quality, i.e., the line quality between the eNB-RS and between the RS-UE differ or the same.

A description has been given with the assumption that the downlink communication is performed among the eNB-RS-UE; however, the switching of the termination between layer-1 and layer-2 can also be performed in a similar manner when the uplink communication is performed among the UE-RS-eNB. Furthermore, the switching of the termination does not need to be performed in accordance with the line quality between the eNB-RS and between the RS-UE. For example, the switching of the termination between layer-1 and layer-2 can be performed in accordance with the service type of data transmitted between the eNB-UE.

[b] Second Embodiment

In the following, a relay station (RS) according to a second embodiment will be described. The advantages and disadvantages when the RS has a sublayer up to layer-1 or layer-2 will be described first. Then, the configuration of the RS and the flow of a process performed by the RS will be described in the order they are listed in this sentence. In the second embodiment, in a similar manner as in the first embodiment, a description will be given of a case, as an example, of the downlink performed among the eNB-RS-UE.

Advantages and Disadvantages of Each Layer

Figure 2:
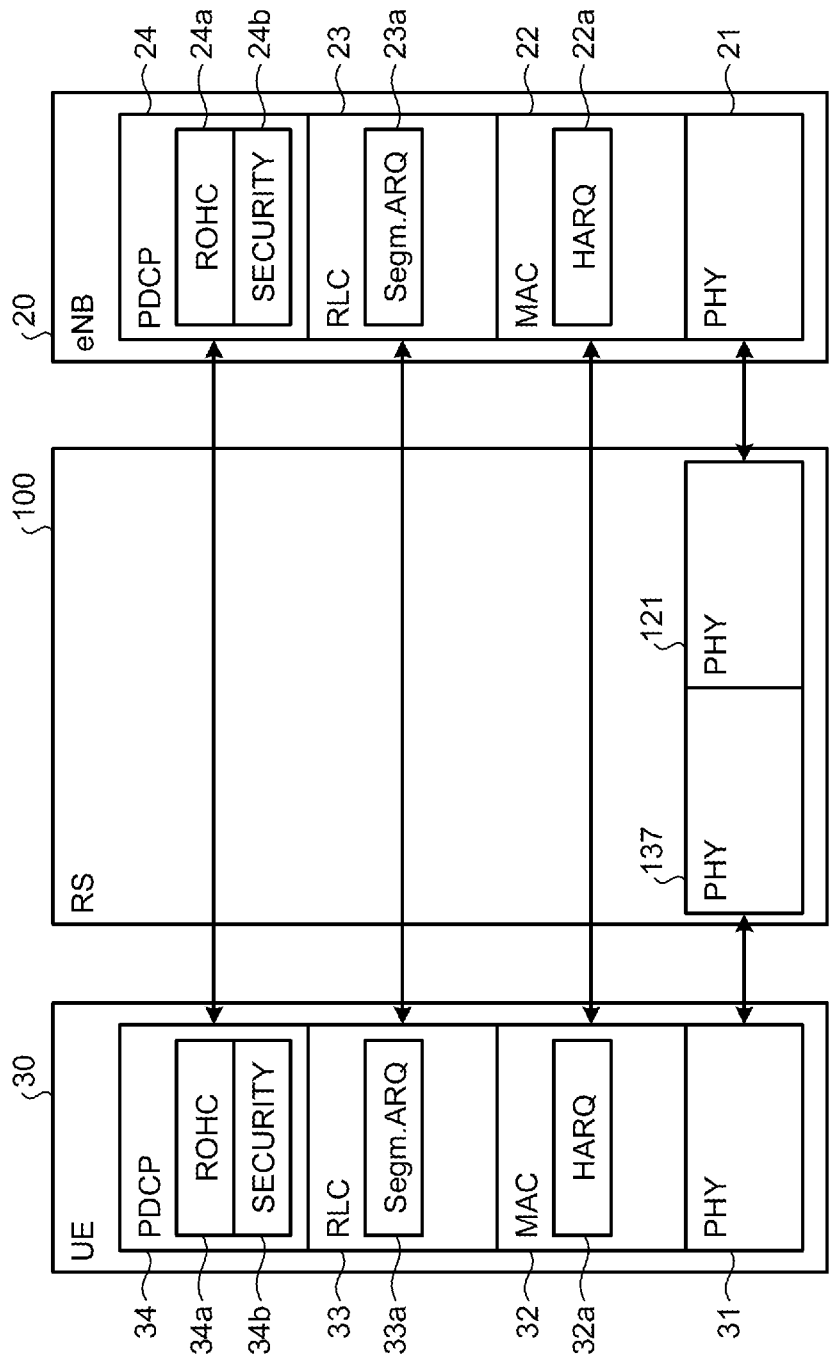
FIG. 2 is a schematic diagram illustrating a protocol configuration when the RS includes up to layer-1.

FIG. 2 is a schematic diagram illustrating a protocol configuration when the RS includes up to layer-1. As illustrated in FIG. 2, an RS 100 includes a Physical (PHY) 121 at the receiving-end and a PHY 137 at the transmission end in layer-1. In contrast, an eNB 20 includes a PHY 21, a medium access control (MAC) 22, a radio link control (RLC) 23, and a packet data convergence protocol (PDCP) 24. The UE 30 includes a PHY 31, a MAC 32, an RLC 33, and a PDCP 34.

The MAC 32 in the UE 30 includes an HARQ 32*a* that sends a hybrid automatic repeat request to the RS 100 using a stop and wait (Stop & Wait) function. The RLC 33 includes a Segm.ARQ 33*a* that sends, to the RS 100, an automatic repeat request (ARQ) for segment data that has a sequence number. The PDCP 34 includes a ROHC 34*a* that performs a header compressing/decompressing process and a SECURITY 34*b* that decodes stream data received from the RS 100.

The MAC22 in the eNB 20 includes an HARQ 22*a* that responds to the hybrid automatic repeat request received from the RS 100. The RLC 23 includes a Segm.ARQ 23*a* that responds to the automatic repeat request (ARQ) received from the RS 100. The PDCP 24 includes an RoHC 24*a* that performs a header compressing/decompressing process and a SECURITY 24*b* that performs a stream encryption process using an encryption key in order to implement the security feature.

In the following, a description will be given of a case in which the RS 100 has up to layer-1 and the layer-1 is used as a termination. As illustrated in FIG. 2, because the RS 100 functions as a termination at the codec level, processes to be performed by the MAC sublayer, the RLC sublayer, and the PDCP sublayer are not performed. Accordingly, the size of the TrBLK is not changed between the RS-UE; therefore, the RS 100 transmits the TrBLK (Transport BLocK) received from the eNB 20 to the UE 30 without changing the size of the TrBLK. In this way, because the size of the TrBLK between the RS-UE is determined on the basis of the line quality between the eNB-RS, the sizes of the TrBLK between the eNB-RS and between the RS-UE are fixed.

Accordingly, between the RS-UE, when the line quality between the RS-UE is worse than that between the eNB-RS, the error rate of data becomes high, which causes the data is less likely to be delivered to the UE 30. In contrast, when the line quality between the RS-UE is better than that between the eNB-RS, the error rate becomes low, thus the data is easily delivered. However, although it is possible to transmit, between the RS-UE, the TrBLK having the size larger than that between the eNB-RS, a TrBLK having the same size as that between the eNB-RS is transmitted, thus wasting the radio resource. Furthermore, because the RS 100 does not have a function of retransmission control, a delay time is short; however, an error is not reset between the eNB-RS and between the RS-UE.

Figure 3:
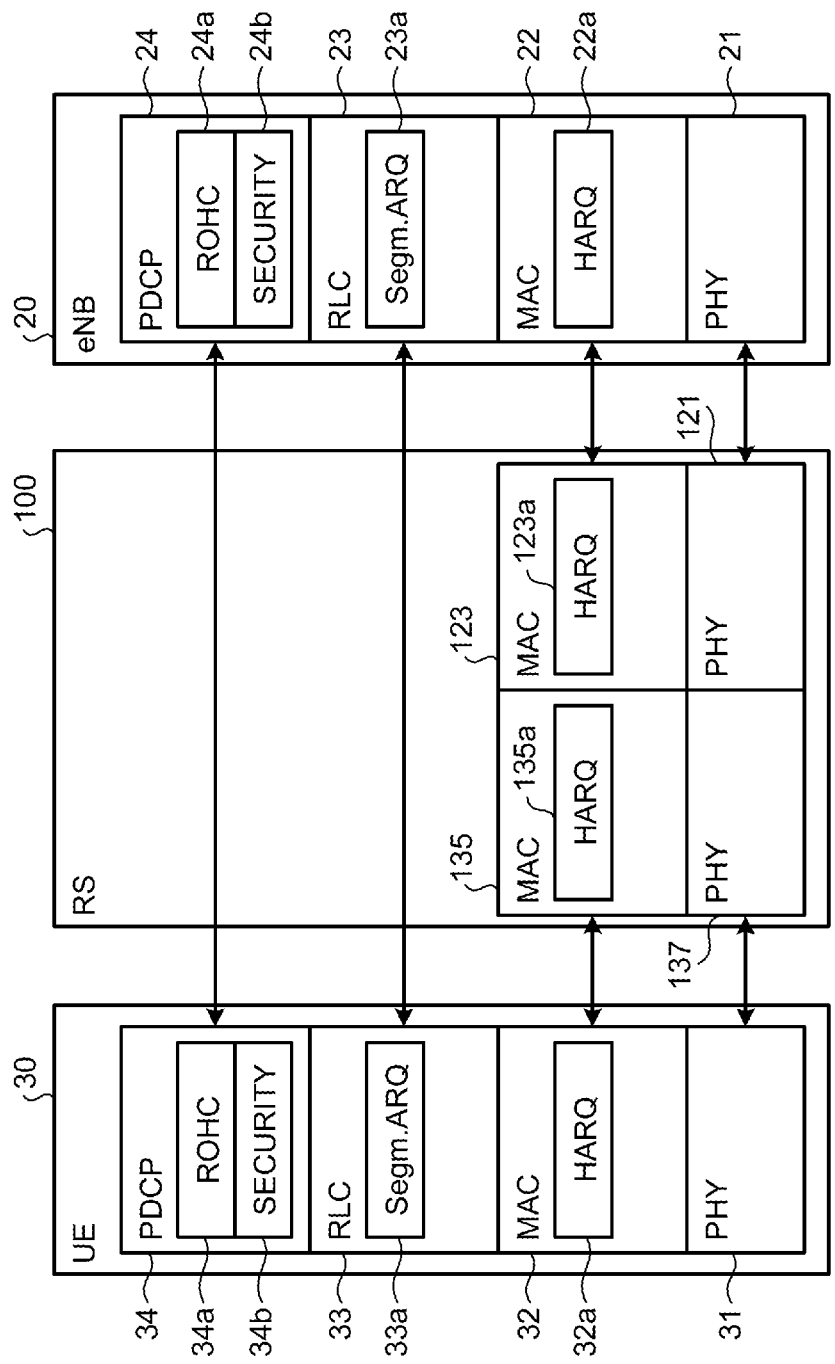
FIG. 3 is a schematic diagram illustrating a protocol configuration when the RS includes up to a MAC sublayer.

In the following, a case will be described in which the RS 100 includes up to the MAC sublayer that is used as a MAC termination. FIG. 3 is a schematic diagram illustrating a protocol configuration when the RS includes up to a MAC sublayer. The example illustrated in FIG. 3 differs from a case in which the RS 100 has up to layer-1 (see FIG. 2) in that the RS 100 includes a MAC 123 at the receiving end and a MAC 135 at the transmission end.

As illustrated in FIG. 3, when the MAC is used as a termination, processes performed by the RLC sublayer and the PDCP sublayer are not performed. Accordingly, in the RS 100, a MAC-SDU (service data unit), which is obtained as a result of an error correction process or a retransmission control performed by an HARQ 123*a* in the MAC 123, is used as a termination and the MAC-SDU is passed down between the eNB-UE.

Accordingly, in the RS 100, the size of the TrBLK can be changed, in MAC-SDU units, between the eNB-RS and between the RS-UE. However, the adjustment can only be performed in MAC-SDU units; therefore, a large amount of padding is added in order to put data in the determined data block and thus transmission data becomes long and the transmission between the eNB-RS-UE becomes inefficient. Specifically, the size of the data block is variable; however, the size is not determined by the transmission end but is determined in accordance with the state of air. Accordingly, when there is no suitable MAC-SDU for the data size, the padding is needed accordingly. Furthermore, because the retransmission control can be performed using the HARQ, data is likely to be delivered; however, the order of the data is changed, a transmission delay occurs when compared a case in which an L1 termination is used.

Figure 4:
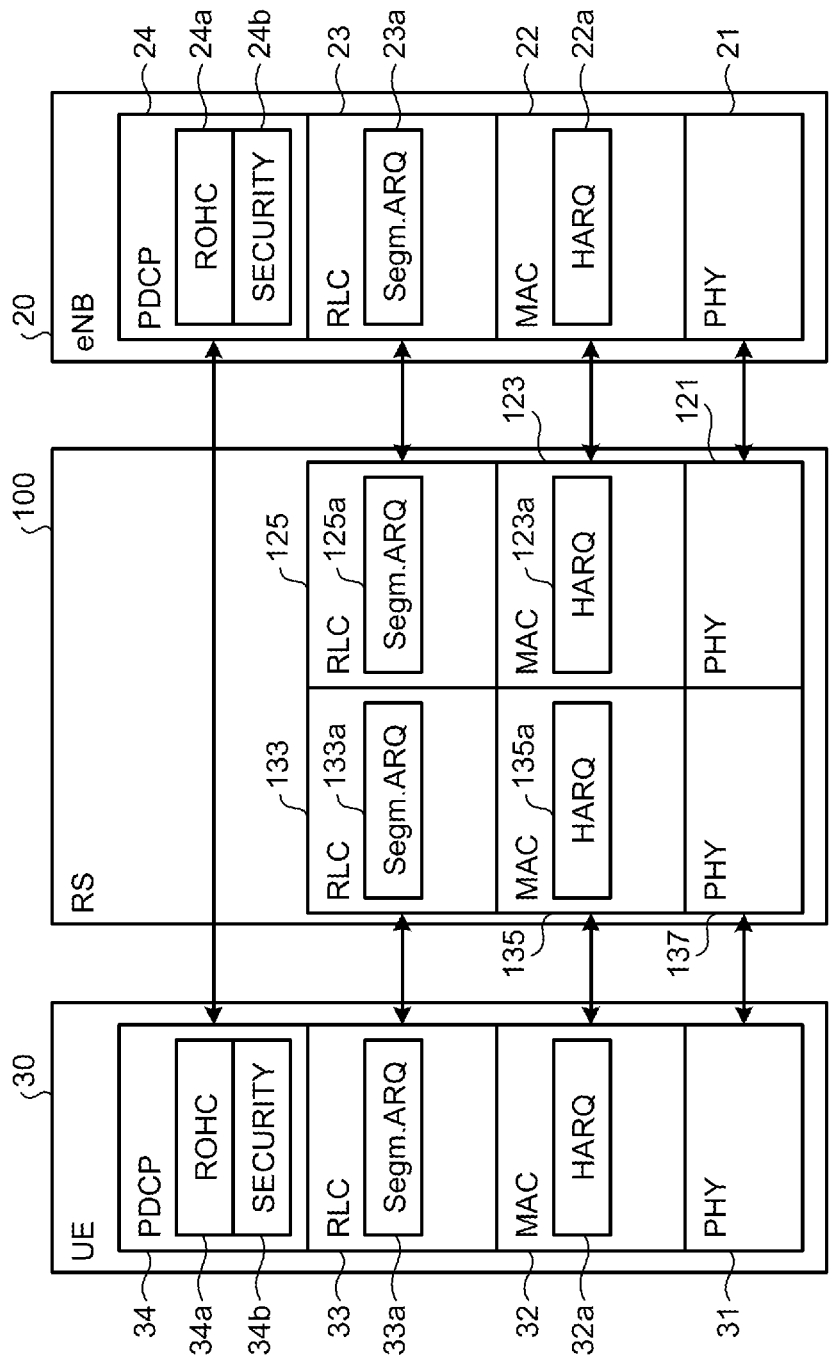
FIG. 4 is a schematic diagram illustrating a protocol configuration when the RS includes up to an RLC sublayer.

In the following, a case will be described in which the RS 100 includes up to the RLC sublayer and an RLC is used as a termination. FIG. 4 is a schematic diagram illustrating a protocol configuration when the RS includes up to an RLC sublayer. The example illustrated in FIG. 4 differs from a case in which the RS 100 includes up to the MAC sublayer (see FIG. 3) in that the RS 100 includes an RLC 125 at the receiving end and an RLC 133 at the transmission end.

As illustrated in FIG. 4, when the RLC is used as a termination, a process performed by the PDCP sublayer is not performed. Accordingly, in the RS 100, an RLC-SDU, which is constructed as a result of the Reordering (order control) performed by a Segm.ARQ 125*a* in the RLC 125, is used as a termination and the RLC-SDU is passed down between the eNB-UE.

Accordingly, in the RS 100, the size of the TrBLK between the eNB-RS and between the RS-UE can be changed in RLC-SDU units. Therefore, it is possible to change the size of the TrBLK in data units (ARQ BLOCK) that is smaller than MAC-SDU units. Furthermore, re-transmission using the HARQ and the ARQ can be performed; however, a delay time is longer than that in a case of using the MAC termination due to the retransmission control and the order control.

Figure 5:
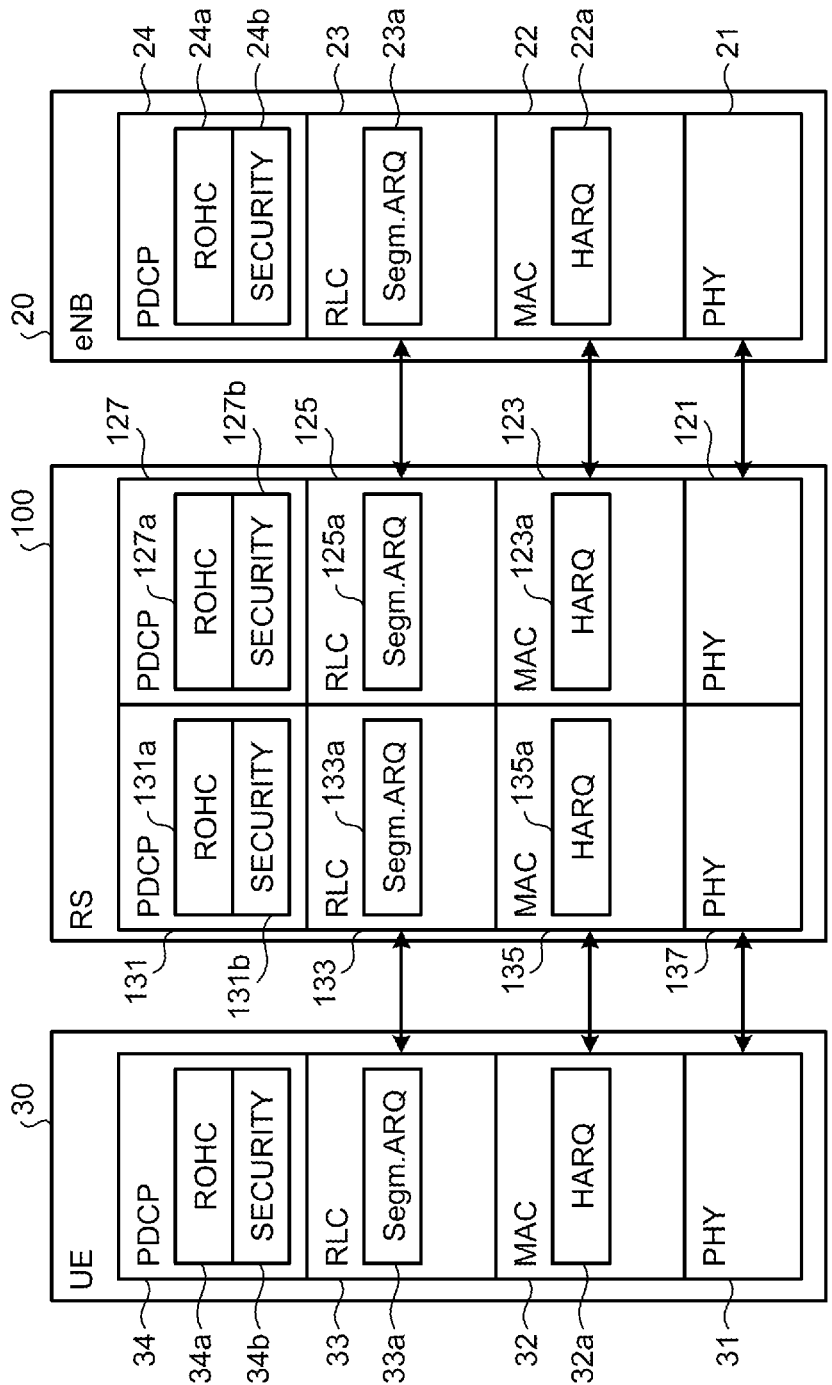
FIG. 5 is a schematic diagram illustrating a protocol configuration when the RS includes up to a PDCP sublayer.

In the following, a case will be described in which the RS 100 includes up to the PDCP sublayer that is used as a PDCP termination. FIG. 5 is a schematic diagram illustrating a protocol configuration when the RS includes up to a PDCP sublayer. The example illustrated in FIG. 5 differs from a case in which the RS 100 includes up to the RLC sublayer (see FIG. 4) in that the RS 100 includes a PDCP 127 at the receiving end and a PDCP 131 at the transmission end.

As illustrated in FIG. 5, when the PDCP is used as a termination, a process is performed in the three sublayer in layer-2. Accordingly, in the RS 100, an IP obtained after an ROHC 127*a* in the PDCP 127 performing a header compressing/decompressing process functions as a termination and, between the eNB-UE, data is passed down the network layer that corresponds to layer 3.

As described above, in the RS 100, profiles of an Internet Protocol (IP), a user datagram protocol (UDP), and a real-time transport protocol (RTP) are defined by the ROHC. Accordingly, in the RS 100, transmission data can be constructed up to an IP and can be transmitted to the UE 30 using a radio system, such as a wideband code division multiple access (W-CDMA), an enhanced data GSM environment (EDGE), or a CDMA 2000. Furthermore, because encryption/decryption is performed by the SECURITY, the security of the transmission data can be improved. However, when the connection is switched to another RS 100 due to the handover because the UE 30 is moved, an encryption key may possibly be changed accordingly. In such a case, re-transmission from the eNB 20 is needed for the UE 30, thus wasting data received by the UE 30 and increasing a delay time due to re-transmission.

The advantages and disadvantages of the layers will be summarized with reference to FIG. 6. FIG. 6 is a list of advantages and disadvantages of each layer included in the RS. For the L1 L(PHY) termination, the MAC termination, the RLC termination, and the PDCP termination, FIG. 6 illustrates the variability of the TrBLK (changeability of size), termination data, the status of the retransmission control and the order control, and advantages and disadvantages thereof.

Specifically, when the L1 is used as a termination, the size of the TrBLK is fixed between the eNB-RS and between the RS-UE and the termination data becomes the TrBLK. Furthermore, when the L1 is used as a termination, it does not have the function for the retransmission control and the order control. The advantage of the L1 termination is that a delay is small when compared with a case in which another sublayer in layer-2 is used as a termination because the retransmission control and the order control are not performed. In contrast, the disadvantage of the L1 termination is that, when an error occurs between the eNB-RS and between the RS-UE, it is not possible to reset the error by performing retransmission. Accordingly, the L1 termination is suitable for transmitting real-time data, such as voice data, in which emphasis is placed on real time content.

Furthermore, when the MAC is used as a termination, the size of the TrBLK can be changed between the eNB-RS and between the RS-UE in MAC-SDU units. The termination data is, of course, the MAC-SDU. Furthermore, when the MAC is used as a termination, the MAC has a function of the retransmission control but does not have a function of the order control. The advantage of the MAC termination is that the retransmission control can be performed by the HARQ. In contrast, the disadvantage of the MAC termination is that, when compared in a case of using the L1 termination, a transmission delay occurs and the order control is not performed.

When the RLC is used as a termination, the size of the TrBLK can be changed between the eNB-RS and between the RS-UE in RLC-SDU units. The termination data is, of course, the RLC-SDU. Furthermore, when the RLC is used as a termination, the RLC has a function of both the retransmission control and the order control. The advantage of the RLC termination is that it is possible to perform both the retransmission control using the HARQ and the order control using the ARQ. In contrast, the disadvantage of the RLC termination is that, when compared in a case in which the MAC termination is used, a delay is greater due to the retransmission control and the order control. Accordingly, the RLC termination can be preferably used for packet transmission in which a packet needs to be reliably transmitted.

When the PDCP is used as a termination, similarly to the RLC termination, the size of the TrBLK can be changed between the eNB-RS and between the RS-UE in the RLC-SDU units. In this case, the termination data is an IP. Furthermore, when the PDCP is used as a termination, in a similar manner as in a case in which the RLC is used as the termination, the PDCP termination has a function of both the retransmission control and the order control. The advantage of the PDCP termination is that a delay becomes greater, due to the retransmission control and the order control, than a case in which the MAC termination is used. Furthermore, the RS 100 can perform transmission by using another radio system because an IP can be used. In contrast, the disadvantage of the PDCP termination is that a delay occurs due to the retransmission control and the order control. Furthermore, because re-transmission from the eNB 20 is needed at the time of handover, a further delay disadvantageously occurs.

Configuration of the RS 100

FIG. 7 is a block diagram illustrating the configuration of a relay station (RS) according to a second embodiment. As illustrated in FIG. 7, the RS 100 includes buffers 111 to 116, an RS receiving-end entity 120, an RS transmission-end entity 130, an RRC 150, and a termination selecting unit 170.

In FIG. 7, the symbol RX indicates an abbreviation of a receiver and the symbol TX indicates an abbreviation of a transmitter. Furthermore, #1 and #2 indicate the number of the logical channel. The number of logical channels is not limited to two; however, any number of logical channels can be used.

The buffers 111 to 116 are memory devices that temporarily store therein data. The buffer 111 holds the TrBLK that is output from an RX L1 (PHY) 121 via an L1 termination switching control unit 122, which will be described later. The buffer 112 holds the MAC-SDU that is output from an RX MAC 123 via a MAC termination switching control unit 124, which will be described later. The buffer 113 holds the RLC-SDU that is output from an RX RLC 125-#1 via an RLC termination switching control unit 126-#1, which will be described later. The buffer 114 holds the RLC-SDU that is output from an RX RLC 125-#2 via an RLC termination switching control unit 126-#2, which will be described later. The buffer 115 holds the IP that is output from an RX PDCP 127-#1, which will be described later. The buffer 116 holds the IP that is output from an RX PDCP 127-#2, which will be described later.

The RS receiving-end entity 120 includes the RX L1 (PHY) 121, an RX MAC 123, RX RLCs 125-#1 and 125-#2, and RX PDCPs 127-#1 and 127-#2.

The RX L1 (PHY) 121 controls a bandwidth or electrical power of one or plurality of antennas (not illustrated). The RX L1 (PHY) 121 outputs a TrBLK that is received from an antenna to the L1 termination switching control unit 122.

The RX MAC 123 uses a TrBLK as the MAC-PDU; analyzes the MAC header of the MAC-PDU; and divides the MAC-SDU multiplexed in the MAC-PDU. The RX MAC 123 outputs, to the MAC termination switching control unit 124, the MAC-SDU that is obtained by dividing the MAC-PDU into two or multiple pieces.

The RX RLCs 125-#1 and 125-#2 use the MAC-SDU as the RLC-PDU and analyzes the RLC header thereof. Each of the RX RLCs 125-#1 and 125-#2 outputs the analyzed RLC-SDU to the RLC termination switching control unit 126-#1 or 126-#2. Furthermore, in this embodiment, when there is no need to distinguish between logical channels, the RX RLCs 125-#1 and 125-#2 are referred to as an RX RLC 125.

The RX PDCPs 127-#1 and 127-#2 use the RLC-SDU as the PDCP-PDU and analyzes the PDCP header thereof. Each of the RX PDCPs 127-#1 and 127-#2 outputs the analyzed PDCP-SDU to the buffer 115 or 116.

Furthermore, the RS receiving-end entity 120 includes the L1 termination switching control unit 122, the MAC termination switching control unit 124, and RLC termination switching control units 126-#1 and 126-#2.

In accordance with the control signal received from the termination selecting unit 170, which will be described later, the L1 termination switching control unit 122 switches an output destination of the data received from the RX L1 (PHY) 121 to the RX MAC 123 or the buffer 111. When the output destination is switched to the buffer 111, the RS 100 becomes the L1 termination.

In accordance with the control signal received from the termination selecting unit 170, which will be described later, the MAC termination switching control unit 124 switches an output destination of the data received from the RX MAC 123 to the RX RLC 125 or the buffer 112. When the output destination is switched to the buffer 112, the RS 100 becomes the MAC termination. When the output destination is the RX RLC 125, the MAC-SDU is output to either one of the RX RLC 125-#1 or 125-#2 in the logical channel corresponding to the received data.

In accordance with the control signal received from the termination selecting unit 170, which will be described later, the RLC termination switching control unit 126-#1 switches the output destination of the data received from the RX RLC 125-#1 to either the RX PDCP 127-#1 or the buffer 113. When the output destination is switched to the buffer 113, the RS 100 becomes the RLC termination. In contrast, when the output destination is switched to the RX PDCP 127-#1, the RS 100 becomes the PDCP termination. For the RLC termination switching control unit 126-#2, substantially similarly to the RLC termination switching control unit 126-#1, the output destination is switched to the RX PDCP 127-#2 or the buffer 114.

The RS transmission-end entity 130 includes TX PDCPs 131-#1 and 131-#2, TX RLCs 133-#1 and 133-#2, a TX MAC 135, and a TX L1 (PHY) 137.

The TX PDCPs 131-#1 and 131-#2 adds a PDCP header to the PDCP-SDU that is read from the buffer 115 or 116. Each of the TX PDCPs 131-#1 and 131-#2 outputs, to a corresponding RLC termination switching control unit 132-#1 or 132-#2, the PDCP-PDU to which the PDCP header is added.

By using the PDCP-PDU that is output from the RLC termination switching control unit 132-#1 or 132-#2 as the RLC-SDU, each of the TX RLCs 133-#1 and 133-#2 adds the RLC header to the RLC-SDU. Each of the TX RLCs 133-#1 and 133-#2 outputs, to a MAC termination switching control unit 134, the RLC-PDU to which the RLC header is added. Furthermore, when there is no need to distinguish between logical channels, the TX RLC 133-#1 and 133-#2 are referred to as a TX RLC 133.

The TX MAC 135 creates the MAC-PDU by multiplexing the RLC-PDU that is output from the MAC termination switching control unit 134. The TX MAC 135 outputs the multiplexed MAC-PDU to an L1 termination switching control unit 136.

The TX L1 (PHY) 137 controls a bandwidth or electrical power of one or a plurality of antennas (not illustrated). The TX L1 (PHY) 137 transmits the MAC-PDU that is input from the L1 termination switching control unit 136 by using different antennas.

Furthermore, the RS transmission-end entity 130 includes RLC termination switching control units 132-#1 and 132-#2, the MAC termination switching control unit 134, and the L1 termination switching control unit 136.

In accordance with the control signal received from the termination selecting unit 170, which will be described later, the RLC termination switching control unit 132-#1 switches, to either the TX PDCP 131-#1 or the buffer 113, an input source that inputs data to the RLC termination switching control unit 132-#1. When the input source is switched to the TX PDCP 131-#1, the RS 100 becomes the PDCP termination. When the input source is switched to the buffer 113, the RS 100 becomes the RLC termination. For the RLC termination switching control unit 132-#2, substantially similarly to the RLC termination switching control unit 132-#1, the input source is switched to either the TX PDCP 131-#2 or the buffer 114.

In accordance with the control signal received from the termination selecting unit 170, the MAC termination switching control unit 134 switches, to either the TX RLC 133 or the buffer 112, an input source that inputs data to the MAC termination switching control unit 134. When the input source is switched to the buffer 112, the RS 100 becomes the MAC termination.

In accordance with the control signal received from the termination selecting unit 170, which will be described later, the L1 termination switching control unit 136 switches, to either the TX MAC 135 or the buffer 111, an input source that inputs the data to the L1 termination switching control unit 136. When the input source is switched to the buffer 111, the RS 100 becomes the L1 termination.

The radio resource control (RRC) 150 is an entity in layer 3 that controls a radio resource. Although not illustrated in FIG. 7, the RRC 150 is connected to the RX T1 (PHY) 121, the RX MAC 123, and the RX RLC 125. The RRC 150 includes a line quality measuring unit 151 that measures the line quality between the eNB-RS and a line quality information receiving unit 152 that receives, from the UE 30, line quality information related between the RS-UE.

The line quality measuring unit 151 measures the error rate of the eNB. Specifically, the line quality measuring unit 151 acquires, from the RX T1 (PHY) 121 contained in the RS receiving-end entity 120, the error rate (CRC error rate) as the error rate of the eNB that affects the TrBLK. The line quality measuring unit 151 can measure, as the error rate of the eNB, the ACK/NACK rate determined by the HARQ by using the RX MAC 123 contained in the RS receiving-end entity 120.

The line quality information receiving unit 152 receives, from the UE 30 as line quality information, the error rate of the communication between the UE 30 and the entity contained in the RS transmission-end entity 130.

The UE 30 measures the error rate in the L1 (PHY) 31, the MAC 32, or the RLC 33 while communicating with the RS 100. The UE 30 transmits the error rate measured in this way to the RS 100. At this time, the UE 30 transmits, to the RS 100, the error rate (CRC error rate) that is measured as the error rate affecting the TrBLK and that is measured in the L1 (PHY) 31 in the UE 30. The line quality information receiving unit 152 receives the error rate that is transmitted from the UE 30 in this way as the error rate of the UE. Furthermore, the line quality information receiving unit 152 can receive, from the UE 30, the ACK/NACK rate determined by the HARQ or can receive, from the TX MAC 135 contained in the RS transmission-end entity 130, the ACK/NACK rate as the error rate of the UE.

The termination selecting unit 170 selects a termination to be used from among layer-1, the MAC sublayer, the RLC sublayer, and the PDCP sublayer. Specifically, in accordance with the difference between the error rate of the eNB measured by the line quality measuring unit 151 and the error rate of the UE received by the MAC termination switching control unit 134, the termination selecting unit 170 selects a layer that is used as a termination. In the following, the difference obtained by subtracting the error rate of the UE from the error rate of the eNB is compared with a threshold; however, it is possible to compare a threshold with the difference that is obtained by subtracting the error rate of the eNB from the error rate of the UE.

For example, when the difference between the error rates is less than a MAC threshold, the termination selecting unit 170 selects layer-1 as a termination and instructs the corresponding termination switching control units at the receiving end and the transmission end to perform the L1 termination switching control. Specifically, the termination selecting unit 170 sends a control signal such that the L1 termination switching control unit 122 outputs the data received by the RX L1 (PHY) 121 to the buffer 111. At the same time, the termination selecting unit 170 transmits a control signal such that the L1 termination switching control unit 136 inputs the data from the buffer 111. Here, the L1 termination is most preferably selected when the difference between the error rates is zero. As the difference increases, the risk of undelivered data is high. Accordingly, the MAC threshold is preferably equal to or less than a predetermined value in which a risk can be avoided.

Furthermore, when the difference between the error rates is equal to or greater than the MAC threshold and is less than the RLC threshold, the termination selecting unit 170 selects the MAC as a termination and instructs the corresponding termination switching control units at the receiving end and the transmission end to perform the MAC termination switching control. Specifically, the termination selecting unit 170 transmits a control signal such that the L1 termination switching control unit 122 outputs the data received by the RX L1 (PHY) 121 to the RX MAC 123. Furthermore, the termination selecting unit 170 transmits a control signal such that the MAC termination switching control unit 124 outputs the data received from the RX MAC 123 to the buffer 112. Furthermore, the termination selecting unit 170 transmits a control signal such that the MAC termination switching control unit 134 input data from the buffer 112. Furthermore, the termination selecting unit 170 transmits a control signal such that the L1 termination switching control unit 136 inputs data from the TX MAC 135.

Furthermore, when the difference between the error rates is equal to or greater than the RLC threshold and is less than a PDCP threshold, the termination selecting unit 170 selects the RLC (function as a logical channel #1 here) as a termination and instructs the corresponding termination switching control units at the receiving end and the transmission end to perform the RLC termination switching control. Specifically, the termination selecting unit 170 transmits a control signal such that the L1 termination switching control unit 122 outputs the data received by the RX L1 (PHY) 121 to the RX MAC 123. Furthermore, the termination selecting unit 170 transmits a control signal such that the MAC termination switching control unit 124 outputs the data received from the RX MAC 123 to the RX RLC 125-#1. Furthermore, the termination selecting unit 170 transmits a control signal such that the RLC termination switching control unit 126-#1 outputs the data received from the RX RLC 125-#1 to the buffer 113. Furthermore, the termination selecting unit 170 transmits a control signal such that the RLC termination switching control unit 132-#1 inputs data from the buffer 113. Furthermore, the termination selecting unit 170 transmits a control signal such that the MAC termination switching control unit 134 inputs data from the TX RLC 133-#1. Furthermore, the termination selecting unit 170 transmits a control signal such that the L1 termination switching control unit 136 inputs data from the TX MAC 135.

When the difference between the error rates is equal to or greater than the PDCP threshold, the termination selecting unit 170 selects the PDCP (functioning as the logical channel #1 here) as a termination and instructs the corresponding termination switching control units at the receiving end and the transmission end to perform the PDCP termination switching control. Specifically, the termination selecting unit 170 transmits a control signal such that the L1 termination switching control unit 122 outputs the data received by the RX L1 (PHY) 121 to the RX MAC 123. Furthermore, the termination selecting unit 170 transmits a control signal such that the MAC termination switching control unit 124 outputs the data received from the RX MAC 123 to the RX RLC 125-#1. Furthermore, the termination selecting unit 170 transmits a control signal such that the RLC termination switching control unit 126-#1 outputs the data received from the RX RLC 125-#1 to the RX PDCP 127-#1. Furthermore, the termination selecting unit 170 transmits a control signal such that the RLC termination switching control unit 132-#1 inputs data from the TX PDCP 131-#1. Furthermore, the termination selecting unit 170 transmits a control signal such that the MAC termination switching control unit 134 inputs data from the TX RLC 133-#1. Furthermore, the termination selecting unit 170 transmits a control signal such that the L1 termination switching control unit 136 inputs data from the TX MAC 135.

The MAC threshold, the RLC threshold, and the PDCP threshold are previously set by, for example, an administrator and are stored in a storing unit (not illustrated). The buffers 111 to 116 are semiconductor memory devices, such as random access memories (RAMs), read only memories (ROMs), or flash memories. The buffers 111 to 116 may also be storage devices, such as hard disks or optical disks. Furthermore, as illustrated in FIG. 7, the buffers 111 to 116 do not need to be individually arranged for entities. The buffers 111 to 116 may be a single storage device.

The entities contained in the RS receiving-end entity 120 and the entities contained in the RS transmission-end entity 130 are an integrated circuit, such as an application specific integrated circuit (ASIC) or a central processing unit (CPU). The RRC 150 and the termination selecting unit 170 is an integrated circuit, such as an application specific integrated circuit (ASIC) or an electronic circuit, such as a central processing unit (CPU) or a micro processing unit (MPU).

Flow of a Process Performed by the RS 100

In the following, the flow of a process performed by the RS according to the embodiments will be described. FIG. 8 is a flowchart illustrating the flow of a termination switching control process according to the second embodiment. The termination switching control process is recursively performed when the eNB-RS-UE are in communication.

As illustrated in FIG. 8, for an entity that is used as a termination, the line quality measuring unit 151 measures, as the line quality, the error rate of the eNB with respect to entities in the RS receiving-end entity 120 (Step S101). The MAC termination switching control unit 134 receives the error rate transmitted from the UE 30 as the error rate of the UE (Step S102).

At this stage, the termination selecting unit 170 determines whether the difference between the error rate of the eNB measured by the line quality measuring unit 151 and the error rate of the UE received by the MAC termination switching control unit 134 is equal to or greater than the MAC threshold (Step S103).

When the difference between the error rates is less than the MAC threshold (No at Step S103), the termination selecting unit 170 selects layer-1 as a termination and instructs the corresponding termination switching control units at the receiving end and the transmission end to perform the L1 termination switching control (Step S104).

In contrast, when the difference between the error rates is equal to or greater than the MAC threshold (Yes at Step S103), the termination selecting unit 170 determines whether the difference between the error rates is equal to or greater than the RLC threshold (Step S105).

When the difference between the error rates is less than the RLC threshold (No at Step S105), the termination selecting unit 170 selects the MAC as a termination and instructs the corresponding termination switching control units at the receiving end and the transmission end to perform the MAC termination switching control (Step S106).

Furthermore, when the difference between the error rates is equal to or greater than the RLC threshold (Yes at Step S105), the termination selecting unit 170 further determines whether the difference between the error rates is equal to or greater than the PDCP threshold (Step S107).

At this stage, when the difference between the error rates is less than the PDCP threshold (No at Step S107), the termination selecting unit 170 selects the RLC as a termination and instructs the corresponding termination switching control units at the receiving end and the transmission end to perform the RLC termination switching control (Step S108).

Furthermore, when the difference between the error rates is equal to or greater than the PDCP threshold (Yes at Step S107), the termination selecting unit 170 selects the PDCP as a termination and instructs the corresponding termination switching control units at the receiving end and the transmission end to perform the PDCP termination switching control (Step S109).

In this embodiment, the order of the processes performed at Steps S101 and S102 described with reference to the flowchart is not limited to the order illustrated in FIG. 8. For example, the process may also be performed in any order. Alternatively, each process may also be performed in parallel. Furthermore, the processes for determining the thresholds performed at Steps S103, S105, and S107 may also be performed in reverse order.

Advantage of the Second Embodiment

As described above, with the RS 100 according to the second embodiment, the disadvantage of the radio environment (line quality) is reduced to a minimum; a layer in which the line quality is advantageously used at the maximum can be used as a termination; and a protocol suitable for the radio environment can be configured. In particular, in the downlink, when compared with a case of the eNB-RS, a radio environment tends to be unstable due to the movement of the UE; however, it is possible to configure a protocol, even between the RS-UE, suitable for the radio environment. Accordingly, the number of re-transmission can be reduced between the eNB-RS-UE, thus improving the throughput.

Furthermore, according to the second embodiment, the termination switching control can be performed for each logical channel. Accordingly, it is possible to configure a protocol suitable for the radio environment for each user equipment.

[c] Third Embodiment

In the second embodiment, a description is given of a case in which a layer is selected as a termination in accordance with the line quality among the eNB-RS-UE; however, the configuration is not limited thereto. For example, a layer may also be selected as a termination in accordance with another standard. Accordingly, in a third embodiment, a description is given of a case in which a layer or a sublayer is selected as a termination in accordance with the service type of data transmitted between the eNB-UE.

Specifically, as described with reference to FIGS. 2 to 6, the amount of delay is less in a case in which the MAC sublayer in layer-2 is used as a termination than in a case in which another sublayer in layer-2 is used as a termination. Accordingly, the MAC sublayer is suitable for transmitting real-time data, such as voice data, in which emphasis is placed on real time content. Furthermore, because the RLC sublayer performs the retransmission control and the order control, the RLC sublayer is suitable for transmitting a file, such as a document or an image, in which emphasis is placed on the guarantee of the delivery. To use the advantage and the service of the sublayer in layer-2 or layer-1, an RS 200 according to the third embodiment additionally includes, in the RRC 150, a service type acquiring unit 153 that acquires the service type of receiving data. The RS 200 according to the third embodiment has the same configuration as that illustrated in FIG. 7, except that the service type acquiring unit 153 is added; therefore, a description thereof will be substituted for a block diagram of the RS 200 according to the third embodiment.

The service type acquiring unit 153 acquires the type of service specified by the UE 30 when an RRC connection request is sent. Specifically, when the RRC connection is established among the eNB-RS-UE, the UE 30 transmits the RRC connection request to the eNB 20. At this time, because the UE 30 specifies a voice service, a packet service, or another service, the service type acquiring unit 153 acquires the service type when it transfers the RRC connection request received from the UE 30 to the eNB 20. Furthermore, the service type acquiring unit 153 holds the acquired service type for each logical channel.

When the service type acquired by the service type acquiring unit 153 is the voice service, the termination selecting unit 170 selects the MAC as a termination and instructs the corresponding termination switching control units at the receiving end and the transmission end to perform the MAC termination switching control. Furthermore, when the service type acquired by the service type acquiring unit 153 is the packet service, the termination selecting unit 170 selects the RLC as a termination and instructs the corresponding termination switching control units at the receiving end and the transmission end to perform the RLC termination switching control. In the third embodiment, a case has been described, in which, when the service type is the packet service, the RLC is selected as a termination; however, even when the PDCP is selected as a termination, a delivery can be guaranteed in a similar manner in a case in which the RLC is used as a termination.

Figure 9:
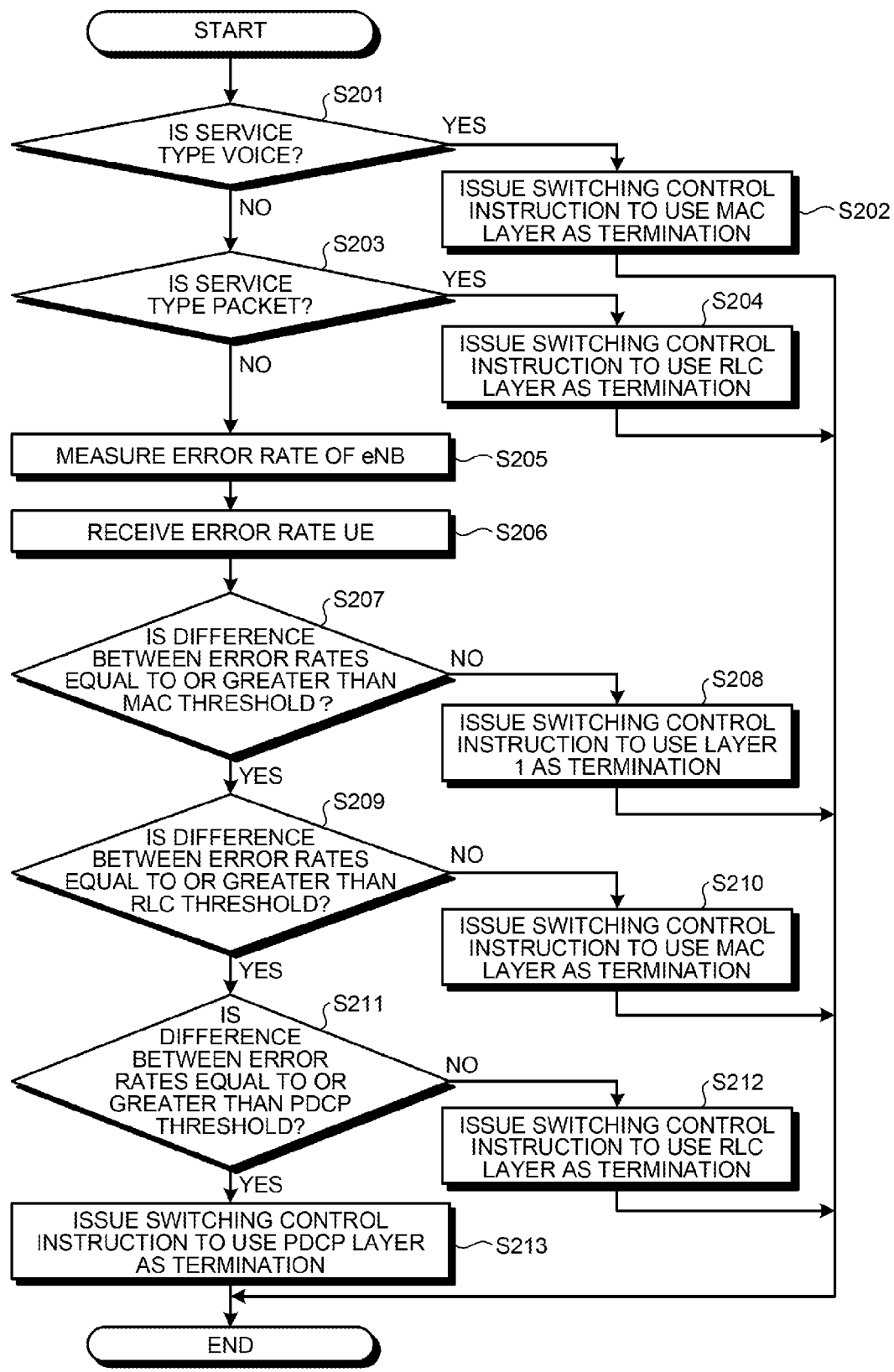
FIG. 9 is a flowchart illustrating the flow of a termination switching control process according to a third embodiment.
Figure 10:
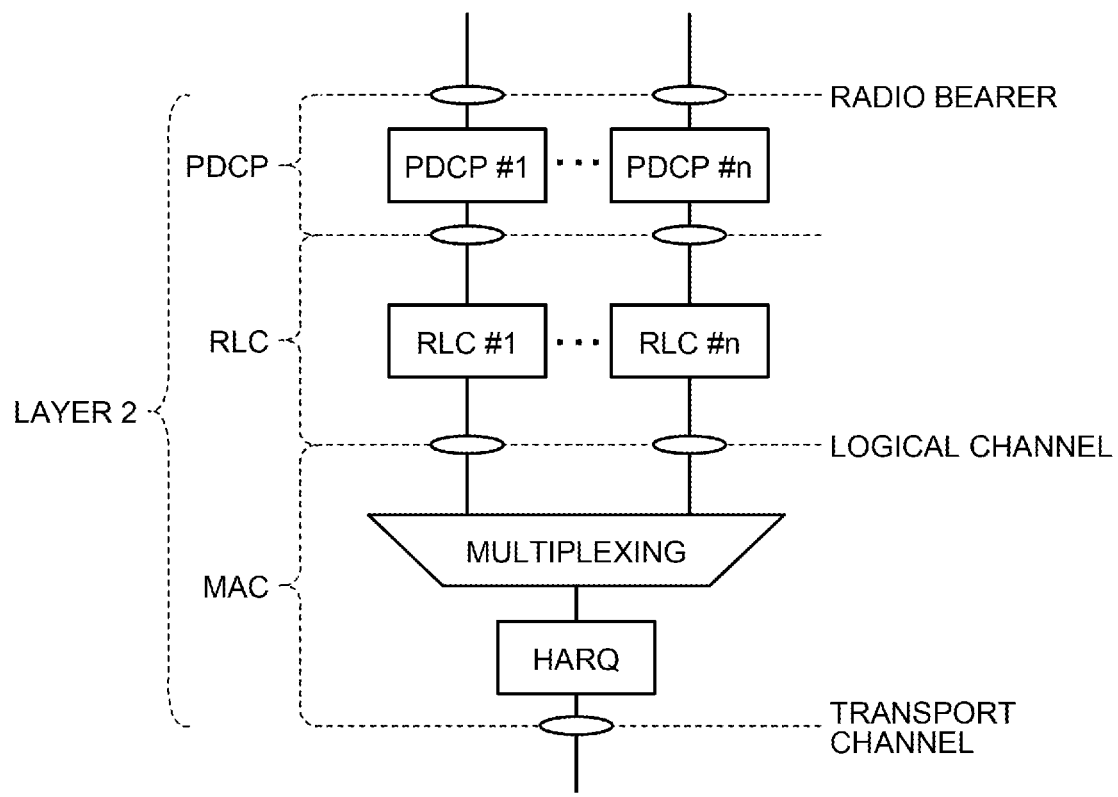
FIG. 10 is a schematic diagram illustrating a protocol configuration of layer-2.
Figure 11:
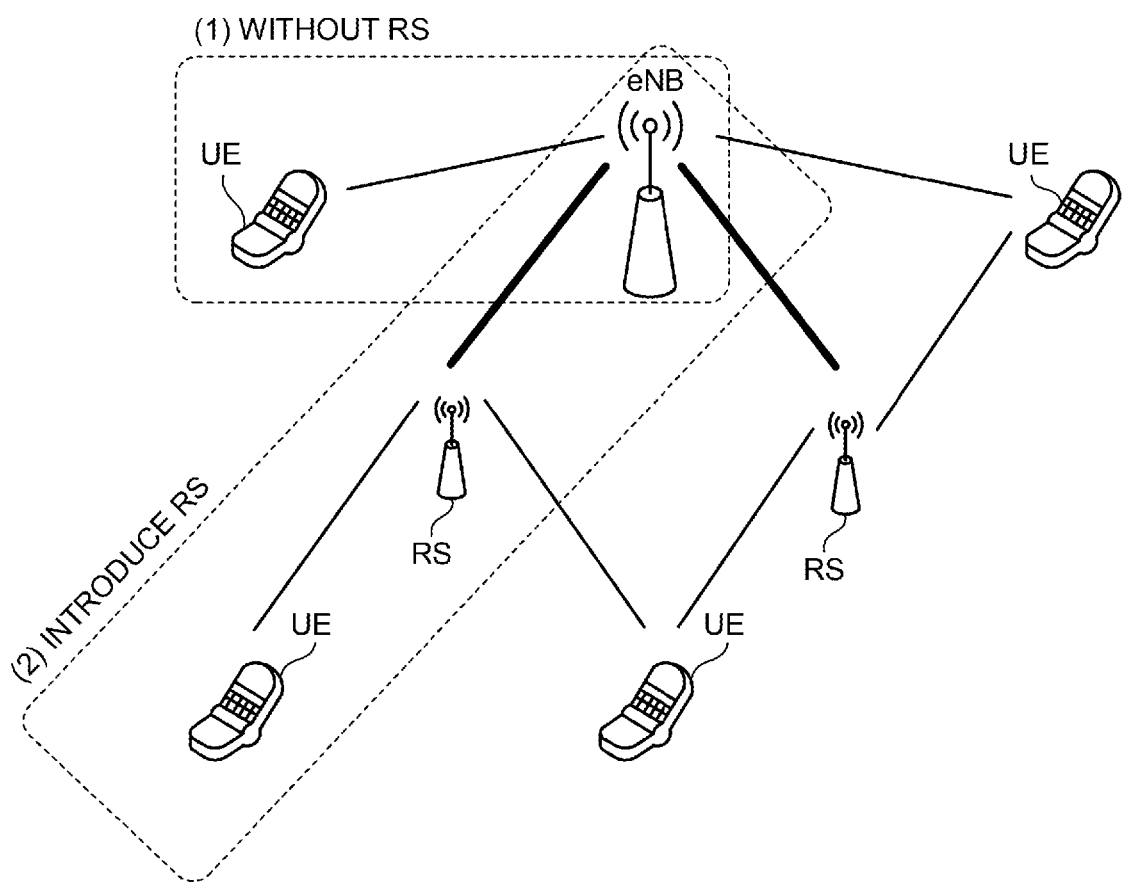
FIG. 11 is a schematic diagram illustrating a system configuration of a communication system when an RS is not used and when an RS is used.

In the following, the flow of a process performed by the RS according to the third embodiment will be described. FIG. 9 is a flowchart illustrating the flow of a termination switching control process according to a third embodiment. This termination switching control process is a process that is recursively performed when communication is being performed among the eNB-RS-UE. A description will be given of a case in which the service type described above is acquired by the service type acquiring unit 153 when the service type acquiring unit 153 requests the RRC connection.

As illustrated in FIG. 9, when the service type acquired at the time of RRC connection request is a voice (Yes at Step S201), the termination selecting unit 170 selects the MAC as a termination and instructs the corresponding termination switching control units at the receiving end and the transmission end to perform the MAC termination switching control (Step S202).

In contrast, when the service type is a packet (Yes at Step S203), the termination selecting unit 170 selects the RLC as a termination and instructs the corresponding termination switching control units at the receiving end and the transmission end to perform the RLC termination switching control (Step S204).

Furthermore, when the service type is not a voice nor a packet (No at Steps S201 and S203), the termination selecting unit 170 performs, as the subsequent processes performed at Steps S205 to S213, the same processes as those performed at Steps S101 to S109 illustrated in FIG. 8.

Specifically, by comparing the difference between the error rate of the eNB and the error rate of the UE and comparing three thresholds, the termination selecting unit 170 performs the termination switching in accordance with the line quality. For example, when the difference between the error rates is less than the MAC threshold, the termination selecting unit 170 selects layer-1 as a termination. Furthermore, when the difference between the error rates is equal to or greater than the MAC threshold and is less than the RLC threshold, the termination selecting unit 170 selects the MAC sublayer as a termination. Furthermore, the difference between the error rates is equal to or greater than the RLC threshold and is less than the PDCP threshold, the termination selecting unit 170 selects the RLC sublayer as a termination. Furthermore, when the difference between the error rates is equal to or greater than the PDCP threshold, the termination selecting unit 170 selects the PDCP sublayer as a termination.

The order of the processes performed at Steps S201 and S203 described above using the flowchart is not limited thereto. For example, the order of the processes may also be changed.

For example, a description will be given of a case in which the termination switching is performed when a voice is acquired as the service type of the logical channel (LCH) #1 and a packet is acquired as the service type of the LCH #2. In accordance with the service type of each LCH received from the service type acquiring unit 153, the termination selecting unit 170 instructs the corresponding termination switching control units at the receiving end and the transmission end to perform the termination switching control.

First, the termination switching performed by the RS at the receiving end will be described. The termination selecting unit 170 transmits a control signal such that the L1 termination switching control unit 122 outputs the data received by the RX L1 (PHY) 121 to the RX MAC 123. Furthermore, the termination selecting unit 170 transmits a control signal such that the MAC termination switching control unit 124 outputs, to the buffer 112, the data on the LCH #1 from among the data received from the RX MAC 123. Furthermore, the termination selecting unit 170 transmits a control signal such that the MAC termination switching control unit 124 outputs, to the RX RLC 125-#2, the data on the LCH #2 from among the data received from the RX MAC 123. Furthermore, the termination selecting unit 170 transmits a control signal such that the RLC termination switching control unit 126-#2 outputs the data received from the RX RLC 125-#2 to the buffer 114.

Subsequently, the termination switching performed by the RS at the transmission end will be described. The termination selecting unit 170 transmits a control signal such that the buffer 114 inputs data to the RLC termination switching control unit 132-#2. Furthermore, the termination selecting unit 170 transmits a control signal such that the TX RLC 133-#2 inputs data to the MAC termination switching control unit 134. Furthermore, the termination selecting unit 170 transmits a control signal such that the buffer 112 inputs the data (LCH #1 data) to the MAC termination switching control unit 134. Finally, the termination selecting unit 170 transmits a control signal such that the TX MAC 135 inputs data to the L1 termination switching control unit 136.

With the termination switching performed in this way, the data (receiving end) on the LCH #1 is delivered to the buffer 112 via the RX L1 (PHY) 121, the L1 termination switching control unit 122, the RX MAC 123, and the MAC termination switching control unit 124. The data (transmission end) on the LCH #1 is delivered to the UE 30 via the buffer 112, the MAC termination switching control unit 134, the TX MAC 135, the L1 termination switching control unit 136, and the TX L1 (PHY) 137.

In contrast, the data (receiving end) on the LCH #2 is delivered to the buffer 114 via the RX L1 (PHY) 121, the L1 termination switching control unit 122, the RX MAC 123, the MAC termination switching control unit 124, the RX RLC 125-#2, and the RLC termination switching control unit 126-#2. The data (transmission end) on the LCH #2 is delivered to the UE 30 via the buffer 114, the RLC termination switching control unit 132-#2, the TX RLC 133-#2, the MAC termination switching control unit 134, the TX MAC 135, the L1 termination switching control unit 136, and the TX L1 (PHY) 137.

Accordingly, the data on the LCH #1 is transmitted to the UE 30 without a delay because the order control is not performed on the data. In contrast, the data on the LCH #2 is guaranteed to be delivered because the retransmission control and the order control are performed. Accordingly, there is no need to wait for the delivery confirmation in layer 3 (network layer), thus improving the throughput.

Advantage of the Third Embodiment

As described above, with the RS 200 according to the third embodiment, the disadvantage of the service type can be reduced to a minimum; a layer in which the service type is advantageously used at the maximum can be used as a termination; and a protocol suitable for the service type can be configured.

MODIFICATION AND THE APPLICATION EXAMPLE

In the first and second embodiments, a description has been given of a case in which terminations are switched in accordance with the line quality between the eNB-RS and between the RS-UE. In the third embodiment, a description has been given of a case in which terminations are switched in accordance with the service type of received data; however, the configuration is not limited these embodiments. For example, the RS may also switch terminations in accordance with another standard.

Furthermore, in the second and the third embodiments, a description has been given of a case in which the termination switching is performed in accordance with the difference between the error rate of the eNB and the error rate of the UE; however, the configuration is not limited thereto. For example, the termination selecting unit 170 may also perform the termination switching in accordance with the line quality when only one error rate out of the two error rates is used. For example, the termination selecting unit 170 monitors the error rate of the UE in time series and holds the minimum value of the error rate of the UE or a history of the average value. Then, when a new error rate of the UE received by the line quality information receiving unit 152 becomes smaller than the minimum value of the error rate of the UE or the average value, the termination selecting unit 170 may also change, to a lower layer, a sublayer or a layer that is to be used as a termination.

Furthermore, in the first, second, and third embodiments, a description has been given of a case in which terminations are switched among the eNB-RS-UE; however, the configuration is not limited this combination. The RS described in the first, second, and third embodiments may also switch terminations even when it relays among the eNB-RS-RS, the RS-RS-UE, or the RS-RS-RS.

The components of each device illustrated in the drawings are only for conceptually illustrating the functions thereof and are not necessarily physically configured as illustrated in the drawings. In other words, the specific shape of a separate or integrated device is not limited to the drawings; however, all or part of the device can be configured by functionally or physically separating or integrating any of the units depending on various loads or use conditions. For example, the buffers 111 to 116 illustrated in FIG. 7 may also be integrated to one. Furthermore, the termination selecting unit 170 may also be connected via a network as an external unit of the RS 100 or 200. Furthermore, it is also possible to implement the function of the RS 100 by allowing other devices to have the line quality measuring unit 151, the line quality information receiving unit 152, the termination selecting unit 170; to be connected to the network; and to cooperate with each other.

Furthermore, of the processes described in the embodiments, the whole or a part of the processes that are mentioned as being automatically performed can also be manually performed. For example, a description has been given of a case in which the termination selecting unit 170 automatically selects layer-1, a MAC sublayer, an RLC sublayer, or a PDCP sublayer; however, they may also be manually selected using a mechanical switch, such as a button or a lever, arranged outside the RS.

According to an aspect of a relay station, a communication system, and a communication method disclosed in the present invention, an advantage is provided in that a suitable protocol can be configured.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A relay station that relays target data received from a radio base station and that transmits the target data to a mobile terminal, the relay station comprising:
   a measuring unit that measures line quality between the radio base station and the relay station;
   a receiving unit that receives line quality information from the mobile terminal; and
   a transmitting unit that changes, when the line quality measured by the measuring unit is different from line quality contained in the line quality information received by the receiving unit, the received target data to data for a layer that is different from the physical layer, and transmits the changed data to the mobile terminal.

2. The relay station according to claim 1, further comprising an acquiring unit that acquires a service type of the target data, wherein in accordance with the service type acquired by the acquiring unit, the transmitting unit transmits the received target data to the mobile terminal by changing the received target data to the target data for the layer that is different from the physical layer.

3. The relay station according to claim 1, wherein the transmitting unit changes, for each logical channel used in the relay station, the received target data to the target data for a layer that is different from the physical layer.

4. A relay station that relays target data between a radio base station and mobile terminal, the relay station comprising:
   a first transmitting unit that processes transmission/reception of a first layer;
   a second transmitting unit that processes transmission/reception of a first sublayer in a second layer;
   a third transmitting unit that processes transmission/reception of a second sublayer in the second layer; and
   a termination selecting unit that selects a termination, from among the first transmitting unit, the second transmitting unit, and the third transmitting unit when a line quality between the radio base station and the relay station is different from that between the relay station and the mobile terminal.

5. A communication system that comprises a relay station that relays target data received from a radio base station and that transmits the target data to mobile terminal, wherein the mobile terminal includes,
   a line quality information transmitting unit that transmits line quality information between the mobile terminal and the relay station, and the relay station includes,
   a measuring unit that measures line quality between the radio base station and the relay station,
   a line quality information receiving unit that receives the line quality information transmitted by the line quality information transmitting unit, and
   a transmitting unit that changes, when the line quality measured by the measuring unit is different from line quality contained in the line quality information received by the receiving unit, the received target data to data for a layer that is different from the physical layer, and transmits the changed data to the mobile terminal.

6. A communication method that is used for a communication system that includes a relay station, which relays target data received from a radio base station and transmits the target data to mobile terminal, the communication method comprising:
   transmitting, by the mobile terminal, line quality information between the mobile terminal and the relay station;
   measuring, by the relay station, the line quality between the radio base station and the relay station;
   receiving, by the relay station, the line quality information that is transmitted at the transmitting; and
   changing, by the relay station, when the line quality measured by the measuring is different from line quality contained in the line quality information received by the receiving, the received target data to data for a layer that is different from the physical layer; and
   transmitting, by the relay station, the changed data to the mobile terminal.

* * * * *